(12) United States Patent
Li et al.

(10) Patent No.: US 9,085,040 B2
(45) Date of Patent: Jul. 21, 2015

(54) FIBER END SURFACE MACHINING DEVICE AND FIBER POSITION STRUCTURE THEREOF

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Zhi-Ming Li, Shenzhen (CN); Le-Peng Wei, Shenzhen (CN); Tao Sun, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 247 days.

(21) Appl. No.: 13/792,218

(22) Filed: Mar. 11, 2013

(65) Prior Publication Data

US 2013/0264313 A1    Oct. 10, 2013

(30) Foreign Application Priority Data

Apr. 9, 2012  (CN) .......................... 2012 1 0100956

(51) Int. Cl.
| | |
|---|---|
| G02B 6/255 | (2006.01) |
| B23K 9/013 | (2006.01) |
| B24B 7/22 | (2006.01) |
| G02B 6/38 | (2006.01) |

(52) U.S. Cl.
CPC ................ *B23K 9/013* (2013.01); *B24B 7/228* (2013.01); *G02B 6/2552* (2013.01); *G02B 6/2553* (2013.01); *G02B 6/3863* (2013.01)

(58) Field of Classification Search
CPC ............ B23K 9/013; B23K 9/24; B23K 9/28; B24B 1/002; B24B 7/228; B24B 9/06; B24B 9/08; G02B 6/255
USPC ............. 219/68, 69.1, 138–144, 121.11, 200, 219/383; 65/142, 269, 387, 405, 508, 509; 385/33–35, 49, 50, 78, 85, 123, 147; 451/42
See application file for complete search history.

(56) References Cited

U.S. PATENT DOCUMENTS

| | | | | | |
|---|---|---|---|---|---|
| 4,737,006 | A | * | 4/1988 | Warbrick | 385/33 |
| 4,758,386 | A | * | 7/1988 | Fanning | 264/1.26 |
| 4,867,776 | A | * | 9/1989 | Sharp | 65/387 |
| 4,932,989 | A | * | 6/1990 | Presby | 65/387 |
| 5,184,433 | A | * | 2/1993 | Maack | 451/41 |
| 5,218,184 | A | * | 6/1993 | Hakoun et al. | 219/383 |
| 2005/0157993 | A1 | * | 7/2005 | Fokine et al. | 385/123 |
| 2005/0207706 | A1 | * | 9/2005 | Schmidt et al. | 385/55 |
| 2013/0263422 | A1 | * | 10/2013 | Li et al. | 29/428 |

* cited by examiner

*Primary Examiner* — Samuel M Heinrich
(74) *Attorney, Agent, or Firm* — Novak Druce Connolly Bove + Quigg LLP (57) ABSTRACT

A fiber end surface machining device includes a base seat, a pair of electrodes, and a fiber position structure. The fiber position structure includes a resisting unit and a driving member. The resisting unit is movably assembled on the base seat and is located between the pair of electrodes. The driving member is rotatably assembled on the base seat adjacent to the resisting unit. The driving member includes a cam portion resisting the resisting unit. When the cam portion rotates to drive the resisting unit to move towards an optical fiber connector, the resisting unit drives an optical fiber of the optical fiber connector to move relative to an optical fiber ferrule of the optical fiber connector, and a length of the optical fiber protruding out of the optical fiber ferrule is adjusted.

17 Claims, 7 Drawing Sheets

FIBER END SURFACE MACHINING DEVICE AND FIBER POSITION STRUCTURE THEREOF

CROSS-REFERENCE TO RELATED APPLICATIONS

This application claims all benefits accruing under 35 U.S.C. §119 from China Patent Application No. 201210100956.X, filed on Apr. 9, 2012, in the China Intellectual Property Office, the disclosure of which is incorporated herein by reference. The application is also related to co-pending applications entitled, "OPTICAL FIBER CONNECTOR AND ASSEMBLING DEVICE FOR THE SAME" (Ser. No. 13/792,215); "FIBER END SURFACE MACHINING DEVICE AND ASSEMLING METHOD FOR OPTICAL FIBER CONNECTOR" (Ser. No. 13/792,219); "OPTICAL FIBER CONNECTOR" (Ser. No. 13/792,221); "OPTICAL FIBER CONNECTOR" (Ser. No. 13/792,222); "OPTICAL FIBER CONNECTOR" (Ser. No. 13/792,223); "OPTICAL FIBER CLAMPING MECHANISM AND OPTICAL FIBER CONNECTOR USING THE SAME" (Ser. No. 13/792,229).

BACKGROUND

1. Technical Field

The present disclosure relates to fiber machining devices, particularly to a fiber end surface machining device and a fiber position structure of the fiber end surface machining device.

2. Description of the Related Art

Fiber To The Home is widely used in the telecommunications field, and many optical fiber connectors are needed for connecting the optical fiber. An optical fiber connector generally includes an optical ferrule with an optical fiber stub already terminated in the optical ferrule, an optical fiber holder, and a clamp sleeve sleeved on the optical fiber holder to fasten a field optical fiber. To improve the quality of optical coupling and minimize Fresnel losses of the optical fiber connector, an end surface of the field optical fiber may be treated by polishing. However, the end surface of the field optical fiber may be scraped during the assembling process of the field optical fiber and generate a plurality of depressions, cracks, or scratches at the end surface of the optical fiber, which will increase a light loss and affect the efficiency of data transmission of the optical connector.

Therefore, there is room for improvement within the art.

BRIEF DESCRIPTION OF THE DRAWING

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
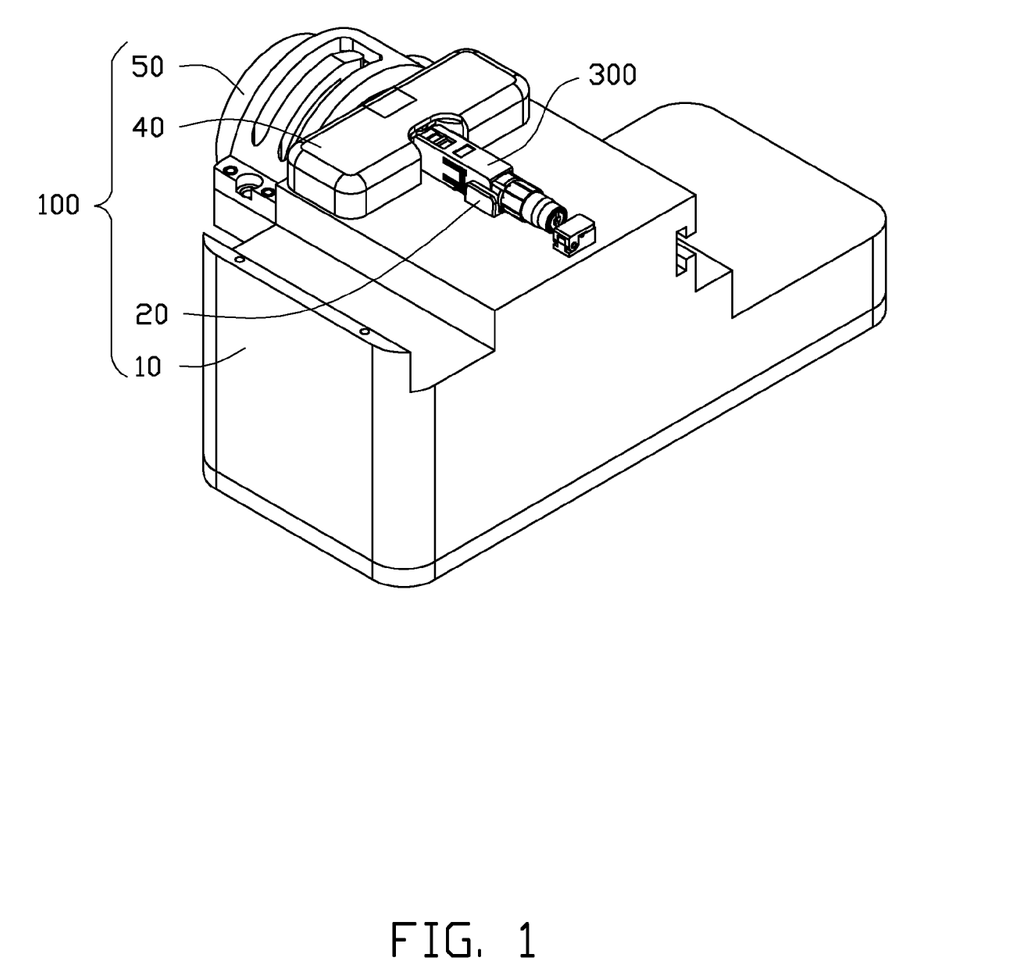
FIG. 1 is an isometric, assembled view of an embodiment of a fiber end surface machining device loading with an optical fiber connector.
Figure 2:
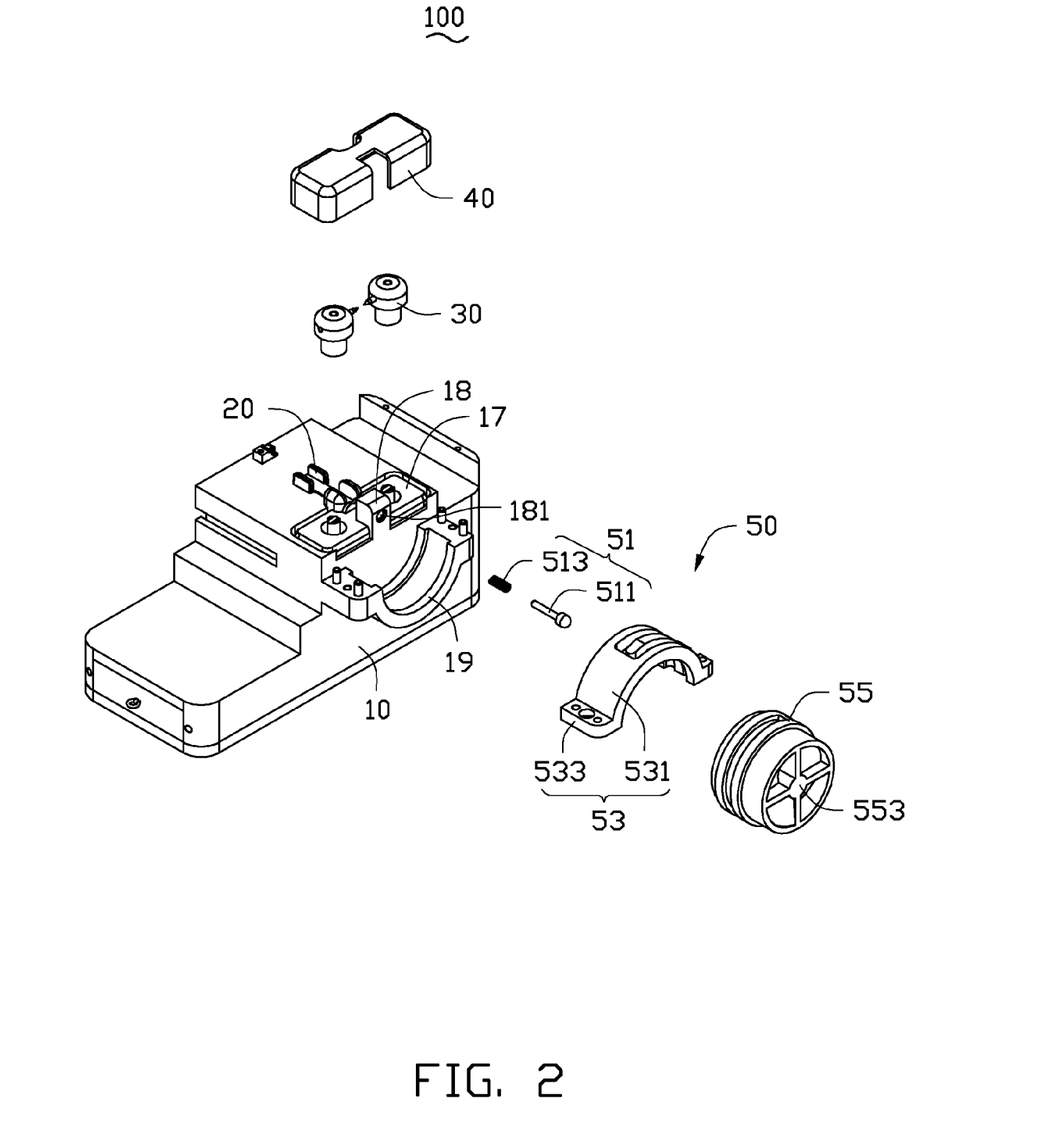
FIG. 2 is an exploded, isometric view of the fiber end surface machining device of FIG. 1 including a fiber position structure.
Figure 6:
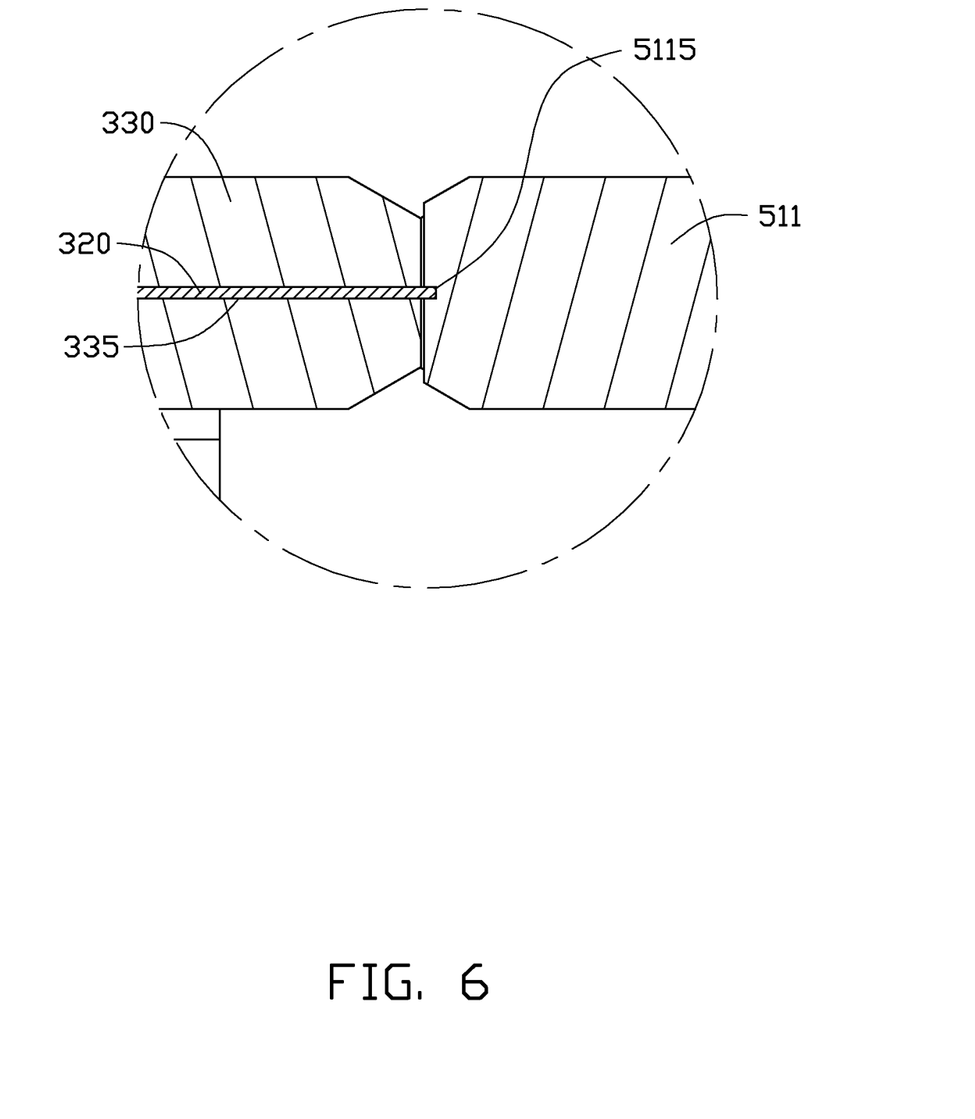
FIG. 6 is an enlarged view of a circled portion VI of FIG. 5.

FIGS. 1, 2, and 6 show an embodiment of fiber end surface machining device 100. The fiber end surface machining device 100 includes a base seat 10, a plurality of restricting members 20, a pair of electrodes 30, a shielding cover 40, and a fiber position structure 50. The restricting members 20 and the pair of electrodes 30 are loaded on a top of the base seat 10. The restricting members 20 are applied for gripping an optical fiber connector 300. The optical fiber connector 300 includes an optical fiber ferrule 310 and an optical fiber 320 received in the optical fiber ferrule 310. The pair of electrodes 30 is applied for heating an end surface of the optical fiber 320. The fiber position structure 50 is located at an end of the base seat 10 for positioning the optical fiber. The shielding cover 40 is applied to the fiber end surface machining device 100 to shield the pair of electrodes 30.

The base seat 10 defines a receiving portion 17 in the top thereof. The receiving portion 17 is located adjacent to an edge of the base seat 10. The base seat 10 forms a connecting portion 18 protruding out of the bottom of the receiving portion 17. The base seat 10 further includes an arcuate assembling portion 19 formed at a sidewall of the base seat 10 adjacent to the receiving portion 17. The connecting portion 18 defines a connecting hole 181 extending in a direction substantially parallel to the top of the base seat 10.

The restricting members 20 are loaded on the top of the base seat 10 adjacent to the receiving portion 17. The pair of the electrodes 30 are received in the receiving portion 17 and are located at opposite sides of the connecting portion 18 respectively. The shielding cover 40 is loaded on the receiving portion 17 to shield the pair of the electrodes 30. The fiber positioning structure 50 is loaded on the assembling portion 19 to adjust a length of the optical fiber 320 protruding out of the optical fiber ferrule 310.

Figure 3:
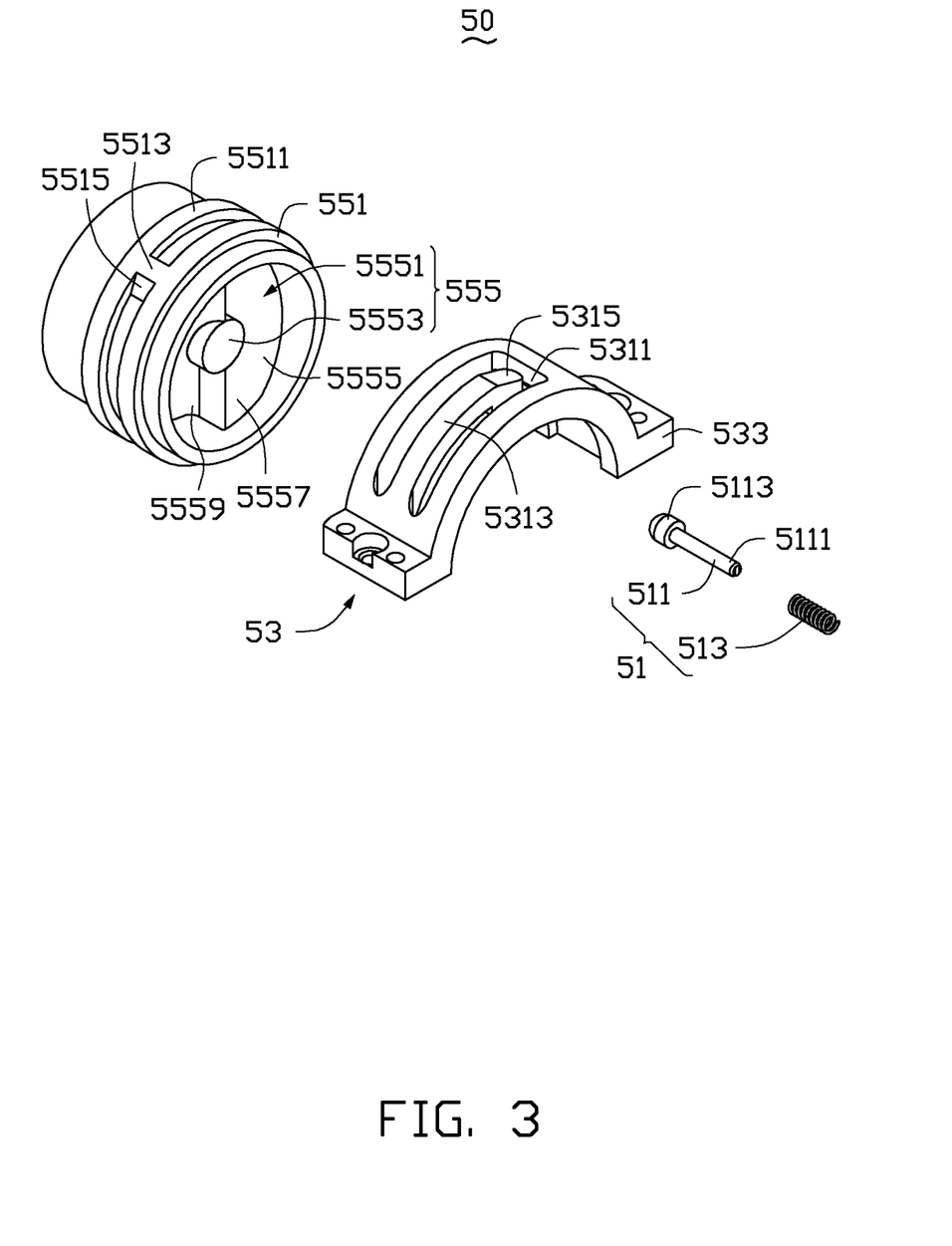
FIG. 3 is an exploded, isometric view of the fiber position structure of FIG. 2.

Also referring to FIG. 3, the fiber positioning structure 50 includes a resisting unit 51, a latching member 53, and a driving member 55. The resisting unit 51 includes a resisting member 511 and an elastic member 513 sleeved on the resisting member 511. The resisting member 511 includes a main body 5111 and a head portion 5113 formed at an end of the main body 5111. The resisting member 511 defines a receiving groove 5115 (see FIG. 6) at an end surface of the main body 5111 away from the head portion 5113. In the illustrated embodiment, the resisting member 511 is made of ceramic materials, and a depth of the receiving groove 5115 is about 3 μm.

The latching member 53 includes a base body 531 and two fixing portions 533 extending from opposite ends of the base body 531. The base body 531 is U-shaped. The base body 531 defines a substantially rectangular hole 5311 in a length direction of the base body 531. The base body 531 forms a latching arm 5313 protruding out of an inner surface of the rectangular hole 5311 extending in a lengthwise direction of the base body 531. The latching arm 5313 forms a latching portion 5315 at a distal end thereof. The latching member 53 is fixed on the assembling portion 19 via the fixing portions 533 for assembling the driving member 55 thereon cooperatively with the assembling portion 19.

Figure 4:
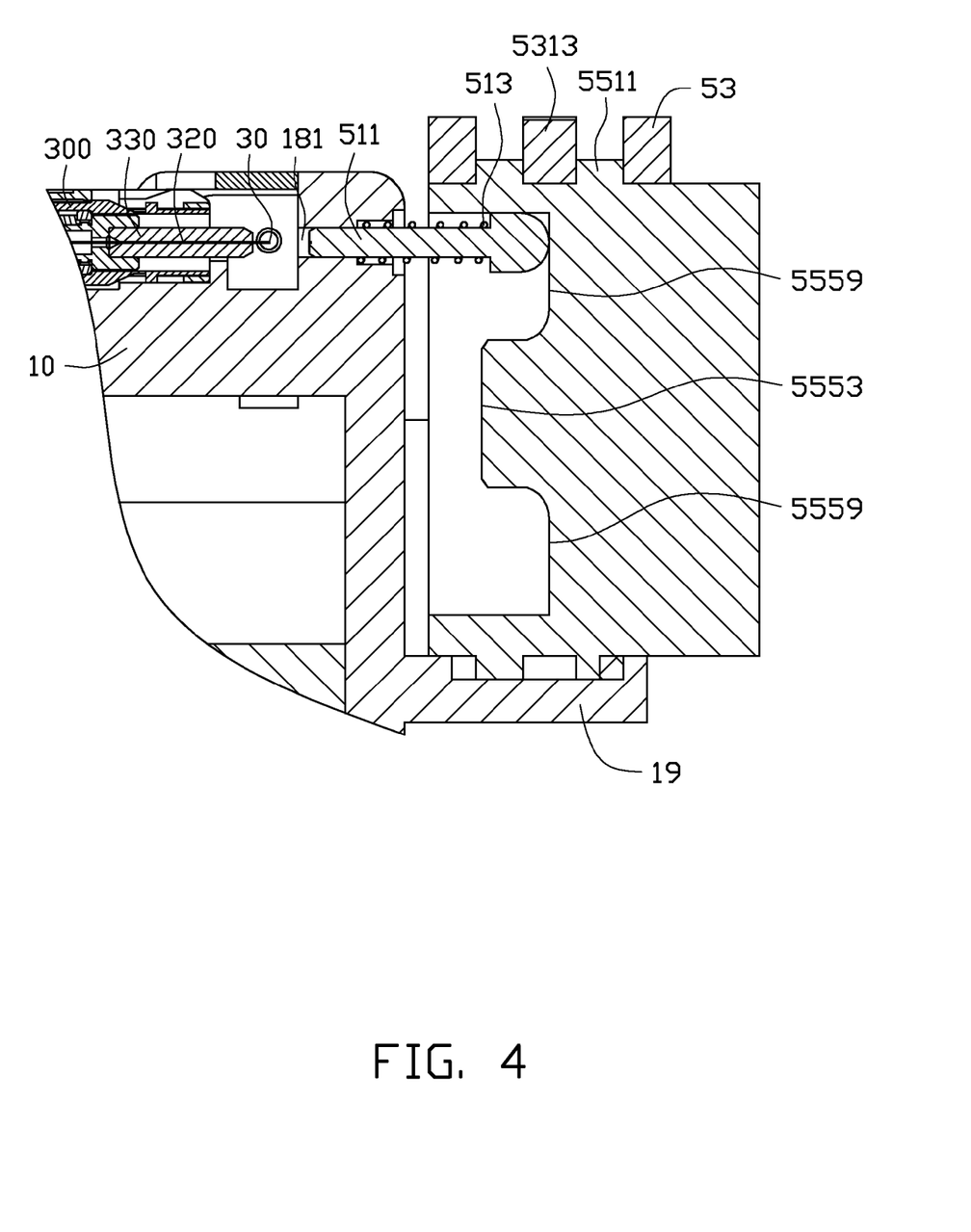
FIG. 4 is a partial, cross-sectional view of the fiber end surface machining device of FIG. 1.
Figure 5:
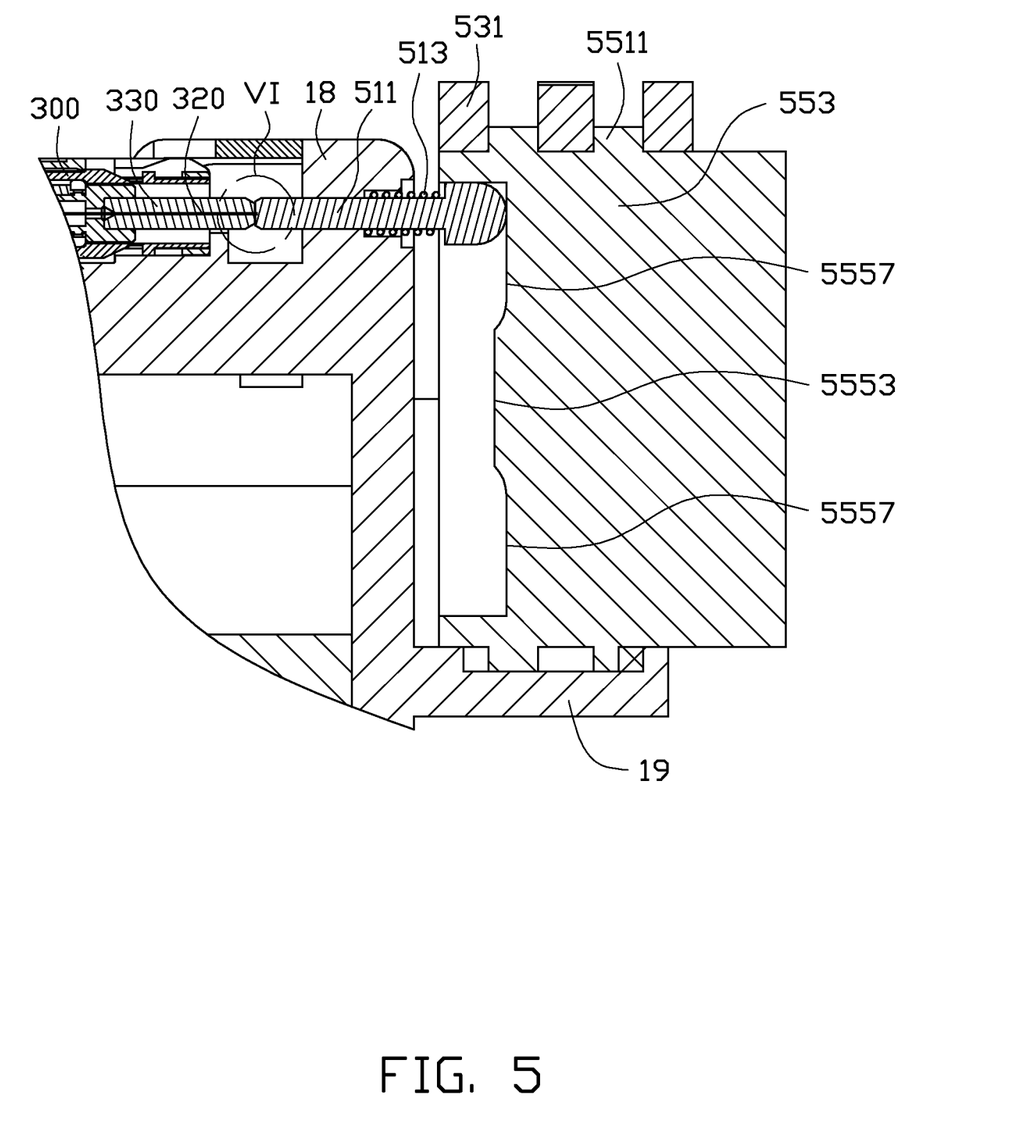
FIG. 5 is similar to FIG. 4, but viewed from another aspect.

Referring to FIGS. 4 to 6, the driving member 55 is cylindrical. In the illustrated embodiment, the driving member 55 is a rotating member. The driving member 55 includes a base portion 551, a gripping portion 553 and a cam portion 555.

The gripping portion 553 and the cam portion 555 are formed at opposite ends of the base portion 551. The base portion 551 is cylindrical. The base portion 551 forms two annular flanges 5511 protruding out of the outer side surface thereof and substantially parallel to each other. The base portion 551 further forms two stoppers 5513 between the two annular flanges 5511 and are located opposite to each other. Each of the two stoppers 5513 forms a slanted surface 5515. In the illustrated embodiment, the latching portion 5315 is received between the two annular flanges 5511, the latching portion 5315 is capable of being deformed to slide along the slanted surface 5515 to make sure the driving member 55 rotates in a first direction. The two stoppers 5513 are also capable of restricting the rotation of the driving member 55 in a second direction opposite to the first direction.

As shown in FIG. 2, the gripping portion 553 includes a plurality of ribs fixed in an end of the base portion 551. The ribs are intersected with each other for facilitating the rotation of the driving member 55. The cam portion 555 resists the head portion 5113 of the resisting member 511. The cam portion 555 includes a base board 5551 fixed in the base portion 551, a post 5553 formed in the center of the base board 5551, and two cam surfaces 5555 surrounding the post 5553. The two cam surfaces 5555 face the base seat 10 and are arranged end to end. Each cam surface 5555 includes a resisting portion 5557 and a receiving portion 5559 at opposite ends thereof. A depth of each cam surface 5555 is gradually increased from the resisting portion 5557 to the receiving portion 5559. As such, the resisting portion 5557 is adjacent to the base seat 10 and the receiving portion 5559 is away from the base seat 10. In the illustrated embodiment, each resisting portion 5557 is located adjacent to one corresponding stopper 5513. When the latching portion 5315 latches with a stopper 5513, one corresponding resisting portion 5557 resists the resisting member 511.

Referring to FIGS. 1 to 6, in assembly of the fiber end surface machining device 100, the resisting members 20 are loaded on the top of the base seat 10, the pair of electrodes 30 are loaded at opposite sides of the connecting portion 18. The main body 5111 of the resisting member 511 is movably assembled in the connecting hole 181 with the elastic member 513 resisted between the head portion 5113 and the connecting portion 18. The shielding cover 40 is covered on the receiving portion 17 to shield the pair of electrodes 30 and the resisting unit 51. The driving member 55 is assembled on the assembling portion 19 with a cam surface 5555 resisting the head portion 5113 of the resisting member 51. The latching member 53 is sleeved on the driving member 55 with the latching arm 5313 received between the two annular flanges 5511. The two fixing portions 533 are fastened on opposite ends of the assembling portion 19 respectively to rotatably fix the driving member 55 to an end of the base seat 10.

In an alternative embodiment, the latching member 53 can be omitted, and the driving member 55 can be rotatably assembled on the assembling portion 19 via a rotatable shaft.

Figure 7:
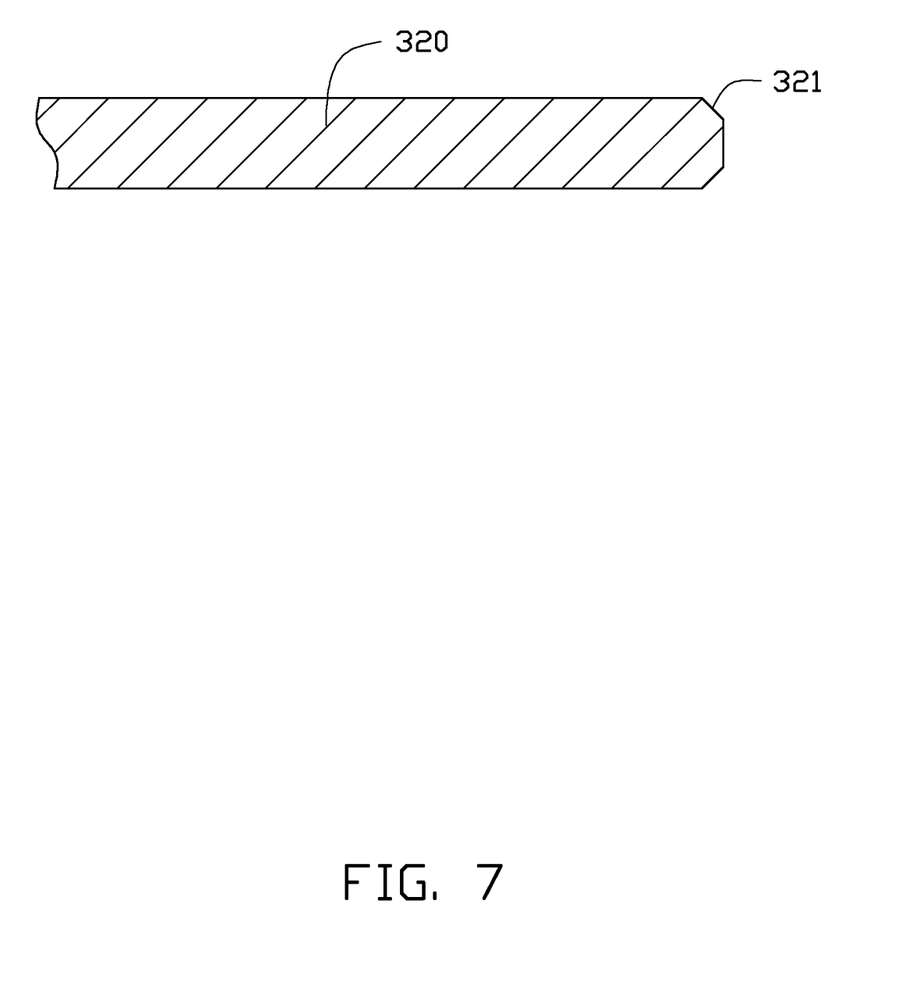
FIG. 7 is a cross-sectional view of an embodiment of an end surface of an optical fiber, after being treated by the fiber end surface machining device of FIG. 1.

In use of the fiber end surface machining device 100 to treat an end surface of the optical fiber 320, the optical fiber connector 300 is fastened between the restricting members 20. A distal end of the optical fiber 320 is protruded out of the optical fiber ferrule 310 and is located between the two electrodes 30. A high pressure electric arc is generated between the two electrodes 30 under a discharge voltage, to heat the end surface to an elevated temperature near the melting point of the fiber material. When all defects of the end surface of the optical fiber 320 have disappeared or have been smoothed out, the heating is stopped to reveal an end surface of the optical fiber 320 with a smooth, rounded configuration. In the illustrated embodiment, the end surface of the optical fiber 320 forms a rounded shoulder 321 surrounding the end surface of the optical fiber 320.

As shown in FIG. 4, in a initial station, the receiving portion 5559 of one cam surface 5555 resists the resisting member 511. Rotating the driving member 55 to move the resisting member 511 towards the base seat 10, and the resisting member 511 drives the optical fiber 320 to move relative to the optical fiber ferrule 310. Rotating the driving member 55 until the resisting portion 5557 resists the head portion 5113 as shown in FIG. 5. At this time, the latching portion 5315 latches with a corresponding stopper 5513, and the main body 5111 resists an end of the optical fiber ferrule 310. The end surface of the optical fiber 320 is received in the receiving groove 5115, and a length of the optical fiber protruding out of the optical fiber ferrule 310 is substantially equal to the depth of the receiving groove 5115.

In an alternative embodiment, the number of the cam surfaces 5555 can be one or more than two, and the number of the stoppers 5513 is the same as the number of the cam surfaces 5555.

In an alternative embodiment, the driving member 55 can be a linear motor to drive the resisting member 511.

In an alternative embodiment, the receiving groove 5115 of the resisting member 511 can be omitted, and a length of the optical fiber 320 protruding out of the optical fiber ferrule 310 is controlled by controlling the moving distance of the driving member 55.

The two electrodes 30 of the fiber end surface machining device 100 is capable of treating the end surface of the optical fiber 320. In addition, it is convenient to position the optical fiber 320 of the optical fiber connector 300 by rotating the cam portion 555 of the fiber position structure 50.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. A fiber end surface machining device for treating an end surface of an optical fiber received in an optical fiber ferrule of an optical fiber connector, the fiber end surface machining device comprising:
    a base seat for fastening the optical fiber connector;
    a pair of electrodes loaded on the base seat; and
    a fiber position structure comprising a resisting unit and a driving member, wherein the resisting unit is movably assembled on the base seat and is located between the pair of electrodes, the driving member is rotatably assembled on the base seat adjacent to the resisting unit, the driving member comprises a cam portion resisting the resisting unit, and when the cam portion rotates to drive the resisting unit to move towards the optical fiber connector, the resisting unit drives the optical fiber to move relative to the optical fiber ferrule, and a length of the optical fiber protruding out of the optical fiber ferrule is adjusted.

2. The fiber end surface machining device of claim 1, wherein the base seat defines a receiving portion in the top of the base seat and forms a connecting portion protruding out of the bottom of the receiving portion, and the pair of the electrodes are received in the receiving portion and are located at opposite sides of the connecting portion respectively.

3. The fiber end surface machining device of claim 2, wherein the connecting portion defines a connecting hole, and the resisting unit is movably assembled in the connecting hole.

4. The fiber end surface machining device of claim 2, further comprising a shielding cover covered on the receiving portion to shield the pair of electrodes and the resisting unit.

5. The fiber end surface machining device of claim 3, wherein the resisting unit comprises a resisting member and an elastic member sleeved on the resisting member, the resisting member includes a main body and a head portion formed at an end of the main body, the main body is movably assembled in the connecting hole with the elastic member resisted between the head portion and the connecting portion, and the cam portion resists the head portion.

6. The fiber end surface machining device of claim 5, wherein the resisting member defines a receiving groove in an end surface of the main body away from the head portion, and the end surface of the optical fiber is received in the receiving groove.

7. The fiber end surface machining device of claim 6, wherein the base seat further comprises an assembling portion formed at a sidewall of the base seat adjacent to the receiving portion, the driving member is loaded on the assembling portion, the fiber positioning structure further comprises a latching member sleeved on the driving member and fastened to the assembling portion to rotatably fix the driving member to the base seat.

8. The fiber end surface machining device of claim 7, wherein the latching member comprises a base body and two fixing portions extending from opposite ends of the base body, and the two fixing portions are fastened on opposite ends of the assembling portion respectively.

9. The fiber end surface machining device of claim 8, wherein the base body is U-shaped, the base body defines a rectangular hole in a length direction of the base body, the base body forms a latching arm protruding out of an inner surface of the rectangular hole extending in a length direction of the base body, and the latching arm forms a latching portion at a distal end of the latching arm.

10. The fiber end surface machining device of claim 9, wherein the driving member comprises a base portion, and the cam portion is formed at an end of the base portion, the forms two annular flanges protruding out of the outer surface of the base portion and substantially parallel to each other, and the base body is sleeved on the base portion with the latching arm is received between the two annular flanges.

11. The fiber end surface machining device of claim 10, wherein the base portion further forms two stoppers between the two annular flanges, and the two stoppers are located opposite to each other, each of the two stoppers forms a slanted surface, the latching portion is received between the two annular flanges, and the latching portion is capable of being deformed to slide along the slanted surface to make the driving member rotate in a first direction.

12. The fiber end surface machining device of claim 10, wherein the cam portion comprises a base board fixed in the base portion, a post formed in the center of the base board, and a pair of cam surfaces surrounding the post.

13. The fiber end surface machining device of claim 12, wherein the pair of cam surfaces face the base seat and are arranged end to end, each of the pair of cam surfaces comprises a resisting portion and a receiving portion at opposite ends thereof, and the driving member resists the head portion of the resisting member via the pair of cam surfaces.

14. The fiber end surface machining device of claim 13, wherein a depth of each of the pair of cam surfaces gradually increases from the resisting portion to the receiving portion.

15. The fiber end surface machining device of claim 10, wherein the driving member further comprise a gripping portion formed at an end of the base portion away from the cam portion.

16. The fiber end surface machining device of claim 15, wherein the gripping portion is a plurality of ribs fixed in an end of the base portion, and the ribs intersect each other for facilitating rotating the driving member.

17. The fiber end surface machining device of claim 1, further comprising a plurality of restricting members for gripping the optical fiber connector.

* * * * *